(12) United States Patent
Reijersen Van Buuren (10) Patent No.: US 10,091,944 B2
(45) Date of Patent: Oct. 9, 2018

(54) SELF-CENTERING BELT-ROLLER ARRANGEMENT AND BELT GUIDING METHOD

(71) Applicant: LELY FORAGE INNOVATIONS B.V., Maassluis (NL)

(72) Inventor: Willem Jacobus Reijersen Van Buuren, Maassluis (NL)

(73) Assignee: FORAGE COMPANY B.V., Maassluis (NL)

(*) Notice: Subject to any disclaimer, the term of this patent is extended or adjusted under 35 U.S.C. 154(b) by 136 days.

(21) Appl. No.: 15/200,212

(22) Filed: Jul. 1, 2016

(65) Prior Publication Data

US 2017/0000037 A1    Jan. 5, 2017

(30) Foreign Application Priority Data

Jul. 2, 2015   (NL) ...................... 2015079

(51) Int. Cl.
*A01F 15/07*   (2006.01)
*A01F 15/18*   (2006.01)
*F16H 7/02*    (2006.01)
*F16H 7/18*    (2006.01)
*F16H 55/36*   (2006.01)

(52) U.S. Cl.
CPC .............. *A01F 15/18* (2013.01); *A01F 15/07* (2013.01); *F16H 7/02* (2013.01); *F16H 7/18* (2013.01); *F16H 55/36* (2013.01); *A01F 2015/186* (2013.01); *F16H 2007/185* (2013.01); *F16H 2055/363* (2013.01)

(58) Field of Classification Search
CPC .... A01F 15/07; A01F 15/18; A01F 2015/186; A01F 15/0705; A01F 15/0833; F16H 7/02; F16H 7/18; F16H 55/36; F16H 2007/185; F16H 2055/363
See application file for complete search history.

(56) References Cited

U.S. PATENT DOCUMENTS

| | | | |
|---|---|---|---|
| 3,075,633 A | 1/1963 | Lo Presti | |
| 4,410,082 A * | 10/1983 | McGinnis | B65G 15/34 198/818 |
| 4,572,359 A * | 2/1986 | Fujita | B65G 15/32 198/819 |
| 4,890,449 A | 1/1990 | Hering | |
| 5,246,099 A | 9/1993 | Genovese | |
| 5,345,300 A * | 9/1994 | Uehara | G03G 15/206 219/216 |
| 6,137,983 A * | 10/2000 | Okabayashi | G03G 15/2057 399/329 |

FOREIGN PATENT DOCUMENTS

| | | |
|---|---|---|
| EP | 0095688 A1 | 12/1983 |
| EP | 0950348 A1 | 10/1999 |
| EP | 1269827 A1 | 1/2003 |
| EP | 2481691 A1 | 8/2012 |
| EP | 2272320 B1 | 11/2012 |

* cited by examiner

*Primary Examiner* — Jimmy T Nguyen (57) ABSTRACT

A belt-roller arrangement with a deflecting roller and an endless flexible belt and a method for guiding such a belt over such a roller are disclosed. The roller body of the roller includes two deformable roller body segments and a rigid roller body segment part which is—in an axial direction—positioned between these two deformable segments. The belt is entirely guided over the central rigid segment part and at least partially over both deformable segments. The belt run is automatically corrected.

21 Claims, 4 Drawing Sheets

SELF-CENTERING BELT-ROLLER ARRANGEMENT AND BELT GUIDING METHOD

FIELD OF THE INVENTION

The invention refers to a belt-roller arrangement with a tensioned endless belt guided over a deformable deflecting roller and to a method for guiding the belt over the roller, in particular for use on board of an agricultural harvester.

BACKGROUND OF THE INVENTION

Different tasks for processing crop material in an agricultural harvester require that a tensioned belt is guided over a deflecting roller and runs in a proper way. Well-known kinds of agricultural harvesters with belts guided over rollers are bale forming apparatuses (balers), combine harvesters, field choppers, and loader wagons.

A round baler forms round-cylindrical bales in a drum-shaped bale forming chamber. In one embodiment this bale forming chamber is surrounded by at least one endless elastic pressing belt and by several pressing rollers. The or every pressing belt is driven by at least one roller. The or every pressing belt is tensioned and is guided over several deflecting rollers. Loose crop material is injected into the bale forming chamber. The expanding loose material in the bale forming chamber applies pressure onto the or every pressing belt. The or every tensioned belt applies compressing pressure onto the loose material.

Further kinds of harvesters convey crop material towards and/or inside a chamber, e.g. a loading chamber or a threshing chamber or a pressing chamber. For conveying the crop material at least one conveyor belt is guided over at least one roller.

In particular in the case of a non-uniform distribution or non-uniform applied load of loose material in the bale forming chamber or further processing chamber the actual run of a pressing belt over a deflecting roller can deviate from a desired belt run. This deviation is undesired. Similar problems can occur in other kinds of harvesters. Several measures for auto-correcting an undesired belt run were proposed.

EP 1269827 B1 discloses a round baler (Rundballenpresse) with a pressing chamber (Pressraum CP). The circumferential surface of the pressing chamber CP is delimited by four parallel pressing belts (Pressriemen R1 bis R4), cf. FIG. 1 and par. [0021]. The four pressing belts R1 to R4 are deflected around several rollers, among them around the deflecting roller (Walze W). This roller W may be rotated in the direction of the arrow 3. It is required that the pressing belts R1 to R4 are guided such that the respective belt center axis is P1 to P4 (vorbestimmte Soll-Position). Four belt supports (Auflagen H1 bis H4) are mounted on the roller W in a sequence parallel to the roller axis and are positioned between the outer surface of the roller W and the inner surface of the respective pressing belt R1 to R4, cf. FIG. 1 and par. [0021]. The support H2 can be implemented as a shell or jacket (Hülse) made of plastic, rubber, or metal (Kunststoff, Gummi oder Metall). It is even possible to make the support H2 adjustable.

In one embodiment of EP 1269827 B1 the center axis of such a support H1 to H4 equals the desired position P1 to P4 of a pressing belt. In a variation the support H2 is not positioned symmetrically around the desired position P2 but is positioned with an offset x parallel to the roller axis, cf. FIG. 2 and par. [0023]. The task of both embodiments is to provide a self-centering effect (Selbstzentrierungseffekt) for the case that the pressing belt R2 is shifted laterally out of the desired position P2.

EP 0095688 B1 discloses a round baler which forms a round bale by means of eight parallel pressing belts 31 to 38, cf. FIG. 3. These pressing belts 31-38 are guided around a deflecting roller (Walze 22), cf. FIG. 4 and FIG. 5. The roller 22 comprises a kernel (Kern 91) made of steel and several rubber sleeves or jackets (Gummibüchsen) 93 to 100, one sleeve or jacket per pressing belt 31 to 38, cf. FIG. 5. A belt 31 to 38 has a larger width than a jacket 93 to 100.

EP 0950348 A1 discloses a round baler 10 with several pressing belts 24, 26, 28, 30 and several drive rollers 44, 48, 52, 56, cf. FIG. 2 and par. [0025]. Each belt 24, 26, 28, 30 is to be tracked in a controlled manner. FIG. 6 shows a driven roller 48 with a sleeve 78 mounted over the circumferential surface of the roller 48. The sleeve 78 provides a crowning effect to the drive roller 48. The sleeve 78 is formed of a rubber material and provides an increased traction between the sleeve 78 made of rubber material and the inner surface of the belt 26. The drive roller 48 itself has a cylindrical surface made of steel. The sleeve 78 prevents belt slippage and improves tracking of the belt 26 by limiting its lateral or sideways moment. An improved tracking for centering of the weight belt is provided, cf. par. [0025]. In a further embodiment of EP 0950348 A1 a roller has a sleeve 78 and a helix structure 68 besides the sleeve, cf. FIG. 7 and par. [0026].

EP 2272320 B1 discloses a plurality of parallel belts 12 guided around a driven roller 10, cf. FIG. 1 and par. [0015]. FIG. 2 ff. show different embodiments of the claimed invention. The figures show the roller without the belts 12. A legging 14 (Belag, revêtement) is applied on the circumferential surface of the roller body, cf. FIG. 2. The legging 14 can be in the form of an elastomeric material, cf. par. [0015]. This material can be adhered to the roller body 16 or can be machined directly into the material of the roller body. The legging 14 is applied in discrete regions 20. In the embodiment of FIG. 2 ff. several grooves 24 in the roller surface form a herringbone pattern. In the embodiment of FIG. 7 several ribs 30 are arranged on the circumferential surfaces.

EP 2481691 A1 discloses a self-centering belt-roller arrangement. The deflecting roller is kept by two lateral lever arms which are positioned perpendicular to the roller rotating axis in two opposite directions.

U.S. Pat. No. 5,246,099 discloses a belt steering roller mechanism which actively corrects the run of an endless belt. FIG. 12 shows an endless belt 145 which is guided around two rollers 20 and 140. The drive roller 140 moves the belt 145 and the steering roller 20 is an idler roller. The steering roller 20 has a shaft 10, a rigid core 35 and an elastomer body 40, cf. FIG. 1, FIG. 2A and FIG. 2B. A plurality of longitudinally extending rigid members 45 are mounted in the elastomer body 40 near the outer diameter of the roller 20. These rigid members are separated by a plurality of longitudinal extending deformable sections 50. A flange plate 55 is located against the fore end 25 or against the aft end 30 and is held on the shaft 10 by a fastening means 60 such that the flange plate 55 can tilt, cf. FIG. 2B.

U.S. Pat. No. 3,075,633 discloses an automatic belt training roller assembly for a belt conveyor. FIG. 1 shows a cross-sectional view which shows a conveying reach 68 and a return reach 70 of a load carrying belt. A carrying roller assembly carries the conveying reach 68 and comprises a center primary load carrying roller 59 and a pair of wing rollers 60 and 61. The return reach 70 rests on a single roller 72 with a center portion of an increased diameter 78 with two ends 79 and 80.

U.S. Pat. No. 4,890,449 discloses a round baler 10 with an attachment 12 for guiding the pressing belts, cf. FIG. 1. The attachment 12 includes an elongated cylindrical roller 34 and a plurality of square plates 36 which are rigidly affixed to the roller 34 in an equally spaced relation along the longitudinal axis 40 of the roller 34. The metal plates 36 may be secured to the metal roller 34 by weldings 38, cf. FIG. 4. FIG. 2 shows a sequence of aid belts 24 guided over the roller 34 and separated by the plates 36.

SUMMARY OF THE INVENTION

A problem solved by the invention is to provide a belt-roller arrangement and a belt guiding method wherein a reliable automatic self-correction of the belt run is achieved in a simple way after a deviation of the actual belt run from a desired belt run to the left or to the right.

The belt-roller arrangement according to the invention comprises at least one deflecting roller with a round-cylindrical roller body and at least one endless flexible belt.

The term "flexible" means in particular that the length of the belt can be increased against the contracting force of the belt.

The roller body of the or every roller is limited by a substantially round-cylindrical circumferential surface. The or every flexible belt is guided under tension around the circumferential surface of the roller body and can be moved in at least one conveying direction perpendicular to the rotating axis of the deflecting roller.

The round-cylindrical roller body of the or at least one roller comprises at least two deformable roller body segments and at least one rigid roller body segment.

The or at least one rigid roller body segment comprises a central rigid roller body segment part which is positioned between both or between two adjacent deformable roller body segments.

The or every belt of the arrangement touches and is guided around the circumferential surface. The or every belt is entirely guided over the or over one central rigid roller body segment part and partially over both or over two adjacent deformable roller body segments. In the case of exactly two deformable segments and exactly one belt this belt is guided partially over the left deformable roller body segment and partially over the right deformable roller body segment. In the case of several belts arranged in a side-by-side fashion one rigid roller body segment per belt is provided. The terms "left" and "right" refer to the conveying direction of the belt. The term "partially" means: Only a stripe of the belt covers a deformable roller body segment but not the entire belt—at least as long as the actual belt run substantially equals the desired belt run.

The arrangement according to the invention operates as follows and the method according to the invention comprises the following steps: During operation the belt is moved in at least one conveying direction. If the moved belt is shifted from the desired belt run with respect to the roller body to the left, i.e. parallel to the roller's rotating axis to the left, the shifted belt covers a larger part of the left deformable roller body segment and a smaller part of the right deformable roller body segment. The belt continues covering the entire central rigid part. Therefore the left deformable roller body segment will be deformed and compressed such that the radial distance between the circumferential surface and the center axis of the deflecting roller decreases in this left segment. The right deformable roller body segment is deformed in the opposite way, i.e. expanded, such that the radial distance between the circumferential surface and the center axis increases in this right segment. This decrease and increase of the deformable segments provides the desired automatic self-centering effect.

Advantages

The belt-roller arrangement according to the invention automatically corrects the run of the or every belt. In the case of a round baler this auto-correction decreases the width of a gap besides the or one belt through which crop material could otherwise be ejected out of the bale forming chamber. Thanks to the invention the auto-correction is performed—regardless whether the belt run deviates parallel to the roller's rotating axis to the left or to the right seen in the conveying direction of the or one belt in the moment of deviation. Therefore the invention can also be used when the or every belt can selectively be moved into a first conveying direction or into the opposite conveying direction. It is not necessary to perform an adjustment step for achieving the auto-correction according to the invention. In the case of several belts guided over the same roller the respective run of every belt is automatically corrective.

The self-correcting effect is achieved purely with passive mechanical parts, namely the roller body segments with different stiffness properties. No actively moved part is required, in particular no belt pusher or actuator for moving the deflecting roller. In addition no lateral guiding element is required, in particular no roller and no stationary element for guiding a belt edge. It is not necessary to use a conical roller or other roller with non-cylindrical shape. In addition the invention saves the need of a sensor which monitors the belt run. The auto-correction is completed quickly.

The larger the belt run deviation is, the larger is the automatic self-centering effect.

The invention can be used with a deflecting roller comprising a roller body which rotates around a stationary roller axle. Or the roller axle rotates around the stationary roller's rotating axis. "Stationary" means that the axle or axis cannot be shifted or pivoted perpendicular to the rotating axis. It is not necessary that the roller axle can pivot, in particular not as described in EP 2481691 A1. It is further not necessary to provide a lever device for the roller axle. Therefore the invention saves space which would be needed in the case of a pivotal part.

The invention does not require an element which is positioned between the or one belt and the circumferential surface of the roller and which can be shifted parallel to the roller axis, e.g. a sleeve or a tube. Such a shiftable element may be subjected to and may cause wear and can cant or block.

For guiding the or every belt the arrangement according to the invention makes it possible but does not require any protrusions or grooves on the circumferential surface of the roller or at that surface of the belt pointing to the roller. This makes it easier to manufacture and to clean the roller and the belt. No debris in a groove or around a protruding element can pollute the arrangement. Such protrusions are subjected to wear.

The invention does not increase the standard size of the deflecting roller —compared with a conventional belt-roller arrangement without auto correction. The reason: Thanks to the invention it is possible to implement the roller body as a round-cylindrical object without any protrusions or grooves.

PREFERRED EMBODIMENTS

Preferably the roller body has a circumferential surface without protrusions. In particular neither a rigid roller body segment nor a deformable roller body segment or a rib on it protrudes out of the circumferential surface. In one variation two lateral stop elements protrude out of the circumferential surface and limit the possible lateral movement of the belt with respect to the roller. Every stop element can have the form of a disk or rectangular plate. In this variation no further element protrudes the circumferential surface.

Preferably the roller body surrounds a roller axle. The roller axle is guided through and carries the roller body. In one embodiment at least one deformable roller body segment extends radially from the roller axle to the circumferential surface of the body of the deflecting roller. This embodiment provides the largest possible distance over which the deformable segment can be compressed towards the roller axle.

It is possible that the entire rigid body segment is—seen in an axial direction—positioned between two deformable roller body segments. It is further possible that the rigid body segment comprises the central part and at least one further rigid part.

In a further embodiment a further part of the rigid roller body segment is positioned between the roller axle on the one side and both or all deformable roller body segments on the other side. The further rigid part may surround the roller axle over its entire length or over a part. The deformable segments and the central rigid part are—seen in a radial direction—positioned between the circumferential surface and the further rigid part. They may surround the further rigid part. Preferably every deformable roller body segment has a tubular shape and surrounds the further rigid roller body segment part. The further part of the rigid segment can rigidly be connected with the central rigid part. This embodiment provides a higher stability without decreasing the auto-correction effect.

Preferably a supporting structure supports and stabilizes at least one deformable roller body segment. Several ribs of the supporting structure are guided through at least one deformable roller body segment and thereby through a deformable material forming a part of the deformable roller body segment. In one implementation at least one rib is guided through both or all deformable segments and through the central part. The or every rib may carry and keep the deformable roller body material by means of a suitable shape, e.g. every rib has a shape of a T or of an L or of an I cross section.

The supporting structure may come in contact with the or every belt guided over the circumferential surface. In an alternative embodiment the or every deformable segment entirely surrounds and hides the supporting structure. In this alternative embodiment no rib protrudes beyond the circumferential surface but every rib is guided through the interior of the roller body.

In one embodiment the roller body is mounted on and is carried by a rigid roller axle. Therefore the roller body surrounds the roller axle. The entire supporting structure or at least a part of the supporting structure is rigidly connected with the roller axle or with a rigid roller body segment which in turn is rigidly connected with the roller axle. Thanks to the rigid connection with the roller axle the supporting structure prevents an undesired movement or deformation of a deformable roller body segment with respect to the roller axle parallel to the conveying direction or opposite to the conveying direction. This undesired deformation can yield an undesired belt run. It enables the desired deformation in an axial direction, however, i.e. towards or away from the roller axle.

In one embodiment a smooth stiffness transition—seen in an axial direction—from a roller body segment with a high stiffness to a segment with a low stiffness is implemented. In one implementation the belt entirely covers the rigid central part and a deformable part with a higher stiffness. At least when running properly the belt partially covers a deformable part with a lower stiffness which is arranged besides the part with higher stiffness. The deformable part with higher stiffness is positioned between the central rigid part and the deformable part with lower stiffness.

In one application exactly one pressing belt is guided over the deflecting roller. This belt is partially guided over both deformable segments. In a further application n parallel pressing belts are positioned in a side-by-side fashion and are guided over the same deflecting roller wherein n is at least 2. All n parallel belts can be conveyed in the same conveying direction. Every belt can have a smaller width compared with the embodiment with exactly one belt. Preferably the roller body comprises at least n rigid roller body segment parts and at least n+1 deformable roller body segments. Every rigid roller body segment part is positioned between two adjacent deformable roller body segments. Every belt is entirely guided over a rigid segment part and partially guided over two adjacent deformable segments. The rigid segment is positioned between these adjacent segments. In one embodiment two adjacent belts partially cover two distinct areas of the same deformable roller body segment.

In one embodiment the belt-roller arrangement comprises exactly one roller which deflects the or every belt. In a further embodiment the belt-roller arrangement comprises several rollers. At least one roller comprises two deformable roller body segments and one rigid body segment part. It is possible that only roller is implemented according to the invention and the or every other roller is implemented in a conventional manner. It is further possible that several rollers are implemented according to the invention and at least on further roller is implemented in a conventional manner.

In one application the deflecting roller implemented according to the invention is an idler roller and is rotated by the or by at least one driven tensioned belt guided over the roller. In a further application the deflecting roller is driven and drives the or every belt.

In one embodiment the or every belt can selectively be moved in one direction or in the opposite direction. Both directions are perpendicular to the roller axis. One application of opposite moving directions: During normal operation the belt is moved in one direction and transports loose material on board of an agricultural harvester, e.g. towards or within a chamber. For removing a jam or a further malfunction the belt is moved in the opposite direction. Thanks to the invention the auto-correcting effect occurs in every one of both moving directions. Besides the inversion of the moving direction no adjustment needs to be performed.

In one application the belt-roller arrangement forms a part of an agricultural harvester, e.g. of a round baler, a combine harvester, a field chopper, or a loader wagon. This harvester is moved over ground and processes loose crop material.

The or every belt of the arrangement conveys loose crop material in the interior of the harvester.

In one application the or every belt guided over the or every roller surrounds a bale forming chamber in which a round-cylindrical bale is formed. In a further application the or every belt conveys loose crop material towards the bale forming chamber, e.g. through a feeding channel, or towards a crop processing or storing room, e.g. a threshing chamber or loading chamber. In yet a further application the or every belt guided around the deflecting roller belongs to a bottom conveyer, e.g. a so-called "Kratzboden", of a loader wagon and conveys loose material away from the crop material inlet guiding into the storage room and to a rear door.

These and other aspects of the invention and of the preferred embodiment will be even more apparent from the detailed embodiment as described below and will be elucidated in detail there.

DETAILED DESCRIPTION OF EMBODIMENT

In the embodiment the invention is used on board of a vehicle comprising an agricultural harvester for forming round-cylindrical bales from loose crop material. The harvester of the embodiment
is moved over ground,
picks up loose crop material from the ground,
conveys the picked-up loose material towards a drum-shaped bale forming chamber,
injects the conveyed loose material through a crop material inlet into the bale forming chamber,
forms under pressure from the injected loose material in the bale forming chamber a round-cylindrical bale,
wraps the circumferential surface of the bale in the bale forming chamber into a net or a plastic film or into several strands of twine, and
ejects the wrapped bale out of the bale forming chamber such that the wrapped bale is deposited on the ground.

Figure 1:
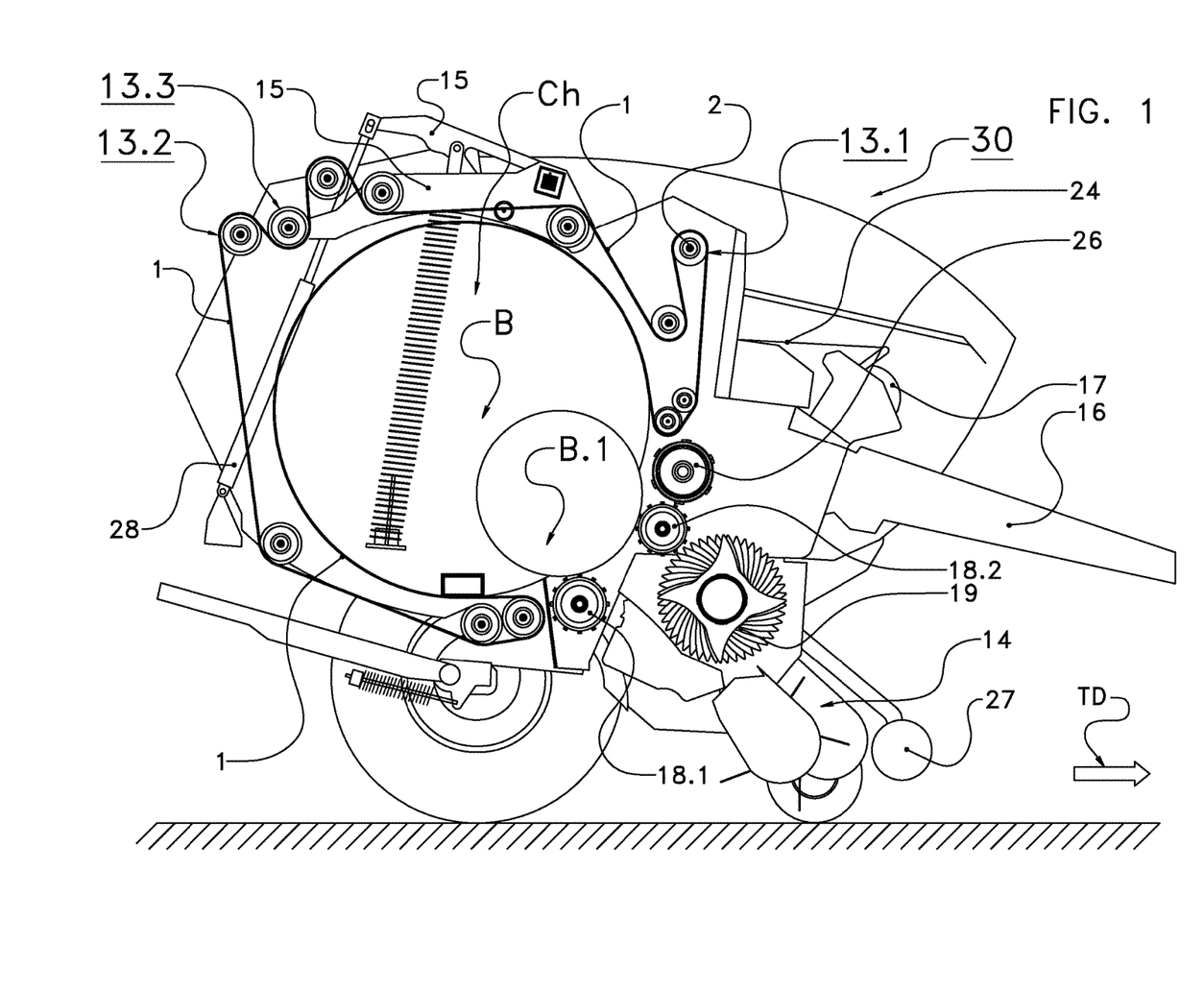
FIG. 1 shows in a side view a round baler in which the invention is used.

FIG. 1 shows the harvester (in this case a vehicle in the form of a round baler 30) in a side view in a vertical middle plane running through the center axis of the round baler 30. The round baler 30 is pulled over ground in a travelling direction TD (in FIG. 1 from left to right) by means of a propelled tractor (not shown). The round baler 30 is mechanically coupled with the pulling tractor by means of a towing unit 16. The rotating or otherwise moved parts of the round baler 30 are driven by a main input shaft (not shown) rotated by the tractor's PTO shaft and/or in a hydraulic or electric manner.

The round baler 30 picks up loose crop material from the ground by means of a pick-up unit 14 with a driven pick-up drum. A pivotal downholder unit 27 positioned angularly above the pick-up drum presses the picked-up crop material downwards. A conveying rotor 19 operates in an undershot manner and conveys the picked-up crop material in a direction opposite to the travelling direction TD through a feeding channel towards and through a crop material inlet into a drum-shaped bale forming chamber Ch.

This bale forming chamber Ch is surrounded by two starter rollers 18.1, 18.2 adjacent to the conveying rotor 19 and by at least one pressing belt 1. The starter rollers 18.1, 18.2 delimit the crop material inlet. The or every pressing belt 1 is guided over several deflecting rollers, among them the driven deflecting roller 13.1 with the roller axle 2 and an idler deflecting roller 13.2 with a further roller axle (not shown). A pivotal tensioning arrangement 15 tensions the or every pressing belt 1. Three movable deflecting rollers 13.2 are mounted on the free end of the tensioning arrangement 15. The or every pressing belt 1 is deflected by these tensioning rollers 13.1, 13.2, 13.3 and by further deflecting rollers and tends to pivot the tensioning arrangement 15 against the retaining force of a retaining device 28. The retaining device 28 comprises two vertical hydraulic piston-cylinder units.

FIG. 1 shows a small bale B.1 during the bale formation process and a large bale B which has reached the required diameter. During the bale formation process an increasing bale first reaches the size B.1 and finally the size B. After the bale B has reached the required diameter, the round baler wraps the circumferential surface of the round bale B in the bale forming chamber Ch into a wrap 24 of wrapping material (a net or plastic sheet or several strands of twine), opens a discharge gate (tailgate) 29 against the force of gravity, and ejects the wrapped bale B out of the bale forming chamber Ch. In the embodiment the web 24 is pulled from a supply reel 17 and is guided by a roller 26 with ribs towards a wrapping material inlet adjacent to the roller 26.

In one embodiment the bale B is further wrapped outside of the bale forming chamber Ch into plastic sheet (baler-wrapper combination). In a further embodiment the ejected bale B is directly deposited on the ground. In every embodiment the entirely or partially wrapped bale B is deposited on the ground. In one embodiment a tilting unit ("quarter turn") tilts the wrapped bale B onto a front face.

Figure 2:
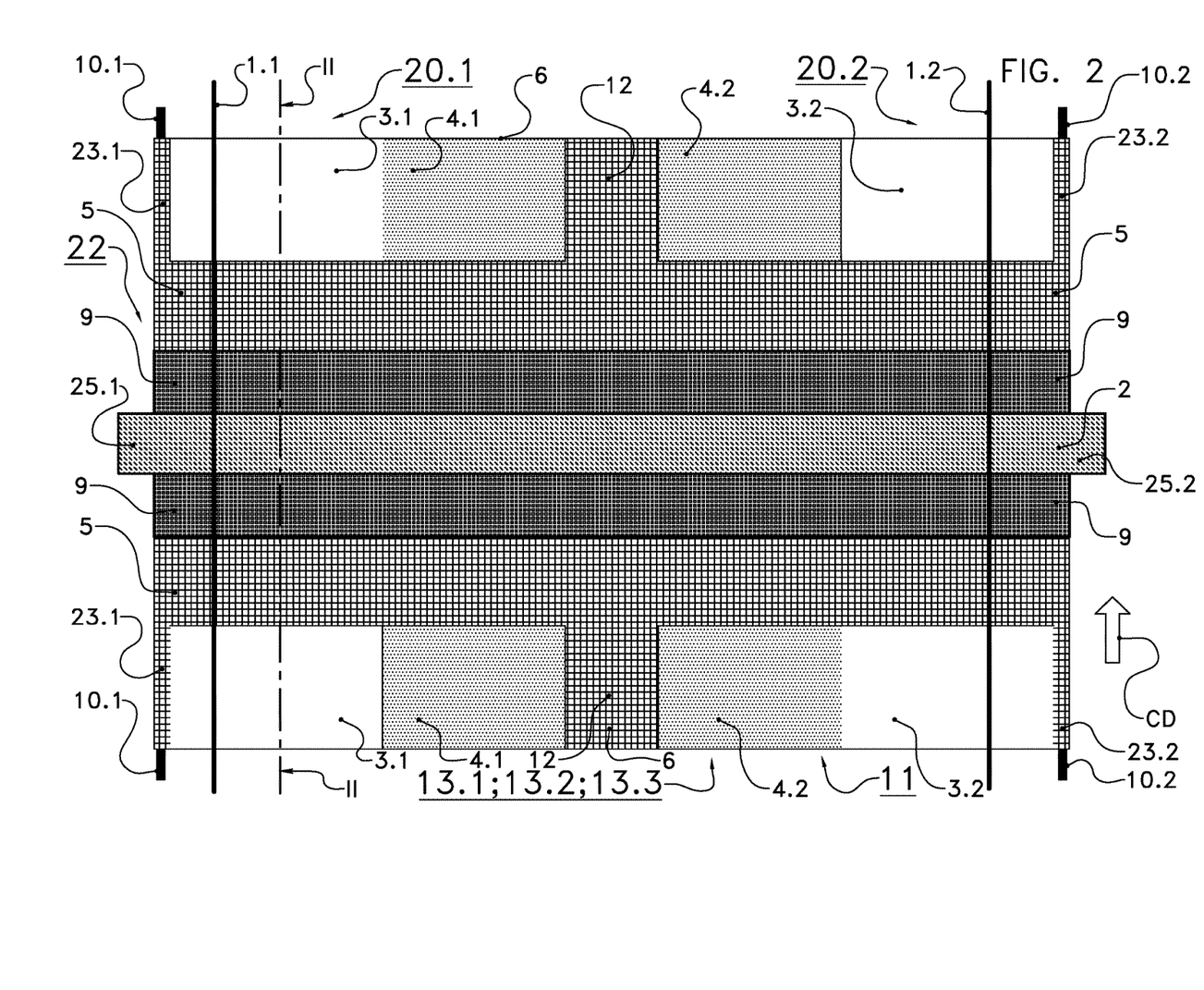
FIG. 2 shows the belt-roller arrangement according to the invention with exactly one endless tensioned belt in a viewing direction perpendicular to the roller axle and perpendicular to the belt surface.

FIG. 2 shows the belt-roller arrangement of one embodiment of the invention. The arrangement comprises
one broad endless flexible pressing belt 1 with a left edge 1.1 and a right edge 1.2 and
the deflecting roller 13.1, 13.2, 13.3 with a roller axle 2 and a round-cylindrical roller body 11 surrounding the roller axle 2.

The viewing direction of FIG. 2 is perpendicular to the conveying plane of the belt 1 and perpendicular to the roller axle 2.

In one implementation the roller body 11 can rotate around the stationary roller axle 2, e.g. by means of a suitable ball bearing (not shown) in the interior of the roller body 11. In a further implementation the roller body 11 is rigidly connected with the roller axle 2 and the roller axle 2 can rotate around its own center axis by means of a roller bearing (not shown) at its lateral axle stubs 25.1, 25.2. In both embodiments the roller axle 2 is carried between the two lateral sidewalls (not shown) of the bale forming chamber Ch.

In one implementation the roller 13.2, 13.3 according to the invention is an idler roller, e.g. a roller mounted on the tensioning arrangement 15 or at the tailgate 29, and the belt 1 rotates the roller body 11. A further roller 13.1 moves the or every belt 1.

In a further implementation the driven roller 13.1 is implemented according to the invention and moves the belt 1. The roller 13 can be driven by a chain drive rotating a sprocket wheel mounted on the roller axle 2 or by an electric motor in the interior of the roller body 11, e.g. It is also possible that the or one driven roller 13.1 and the or one either roller 13.2, 13.3 are implemented according to the invention.

In every implementation the pressing belt 1 is an endless flexible belt. The length of the belt 1 can be increased against the contracting force of the belt 1. In one implementation the or every belt 1 can comprise an inner supporting layer with a higher stability and two outer layers surrounding the inner layer.

The or every belt 1 is moved with respect to the roller 13.1, 13.2, 13.3 in the conveying direction CD (in FIG. 2 from below to above). The conveying direction CD is perpendicular to the middle axis of the roller axle 2 and is in the drawing plane of FIG. 2. The terms "left" and "right" used below refer to the conveying direction CD. The pressing belt 1 is tensioned and is guided under tension around the circumferential surface 6 of the roller body 11. In one implementation the belt 1 entangles and wraps the roller body 11 with an angle between 30 degrees and 150 degrees, cf. FIG. 1 and FIG. 3.

The roller body 11 comprises
  a tubular kernel roller body segment 9 which entirely surrounds the roller axle 2—except two protruding lateral axle stubs 25.1, 25.2—
  a rigid intermediate roller body segment 22 comprising a central part 12, a tubular interior rigid part 5, and two lateral rigid parts 23.1, 23.2 with a high shore (stiffness) wherein the central part 12 and the lateral parts 23.1, 23.2 are mounted on the inner part 5,
  an annular left deformable roller body segment 20.1,
  an annular right deformable roller body segment 20.2, and
  two annular lateral stop elements 10.1, 10.2 mounted on the lateral parts 23.1, 23.2 of the rigid roller body segment 22 and protruding from the circumferential roller surface 6.

The two deformable segments 20.1, 20.2 comprise
  two outer tubular deformable roller body segment parts 3.1, 3.2 with a low shore and
  two inner tubular deformable roller body segment parts 4.1, 4.2 with a medium shore.

The two left parts 3.1, 4.1 form a left deformable roller body segment 20.1. The two right parts 3.2, 4.2 form a right deformable roller body segment 20.2. The terms "left" and "right" and "outer" and "inner" and "lateral" refer to the conveying direction CD. The terms "central" and "intermediate" refer to a radial direction with respect to the roller axle 2.

The intermediate rigid segment 22 is made of a rigid material with a high weight, preferably of steel, and surrounds the kernel segment 9. In one implementation the kernel segment 9 is rigid and is preferably made of a material with low specific weight, e.g. is made of plastic. It is also possible that the kernel segment 9 is deformable or is hollow and provides a cavity for air or a further fluid, e.g. a lubricating fluid.

As can be seen in FIG. 2 the central part 12 of the rigid intermediate roller body segment 22 is—in an axial direction—positioned between the two inner deformable roller body segment parts 4.1, 4.2. The rigid tubular part 5 surrounds the kernel segment 9. Seen in the conveying direction CD the inner deformable roller body segment parts 4.1, 4.2 are positioned between the outer deformable roller body segment parts 3.1, 3.2. The circumferential surface 6 of the roller 13.1, 13.2, 13.3 is formed by
  a surface area provided by the central rigid part 12,
  two inner deformable surface areas provided by the inner deformable roller body segment parts 4.1, 4.2,
  two outer deformable surface areas provided by the outer deformable roller body segment parts 3.1, 3.2, and
  two small outer rigid surface areas below the stop elements 10.1, 10.2 and provided by the rigid lateral parts 23.1, 23.2.

The surfaces of the segments 3.1, 4.1, 4.2, 3.2 and the surface of the part 12 are in flush.

The pressing belt 1 is delimited by two lateral edges 1.1, 1.2, namely a left edge 1.1 and a right edge 1.2 seen in the conveying direction CD. If the belt 1 runs as desired, the distance between the left edge 1.1 and the left stop element 10.1 is equal to the distance between the right edge 1.2 and the right stop element 10.2. Thanks to the distances to the stop elements 10.1 and 10.2 the belt 1 is guided such that it
  entirely covers the central rigid part 12,
  entirely covers the inner deformable roller body segment parts 4.1, 4.2, and
  partially covers two inner areas of the outer deformable roller body segment parts 3.1, 3.2.

The tension which the tensioned belt 1 applies on the circumferential surface 6 is so high that a deformable roller body segment 20.1, 20.2 can be deformed.

The spaces between the belt edges 1.1, 1.2 and the stop elements 10.1, 10.2 make it possible that the tensioned belt 1 can be shifted laterally to the left or to the right towards one stop element 10.1 or 10.2.

As injected and pressed crop material is not uniformly distributed in the pressing chamber, the expanding crop material can apply an unbalanced pressure onto the pressing belt 1. Therefore the belt run can deviate from the desired belt run, i.e. from a belt run with equal distances to the lateral stop elements 10.1 and 10.2, and can be shifted to the left or to the right. The effect of the invention is described for the case that the belt run deviates to the left, i.e. the belt 1 is shifted towards the left stop element 10.1.

As the belt 1 is shifted to the left, the belt 1 only covers a smaller part of the right outer deformable roller body segment part 3.2. Therefore the pressure onto this deformable segment 3.2 decreases. Thanks to the reduced pressure the segment part 3.2 obtains a larger diameter in the non-covered surface segment and also adjacent to the right belt edge 1.2. As the compressed deformable part 3.2 tends to expand, a belt strip adjacent to the right edge 1.2 is slightly moved away from the roller axle 2 in a radial direction. In addition a larger part of the left outer segment part 3.1 is covered and compressed by the belt 1. A belt strip adjacent to the left belt edge 1.1 is slightly compressed, i.e. is moved towards the roller axle 2 in the opposite radial direction. These effects will shift the belt 1 to the right and therefore back into the desired central belt run.

Figure 3:
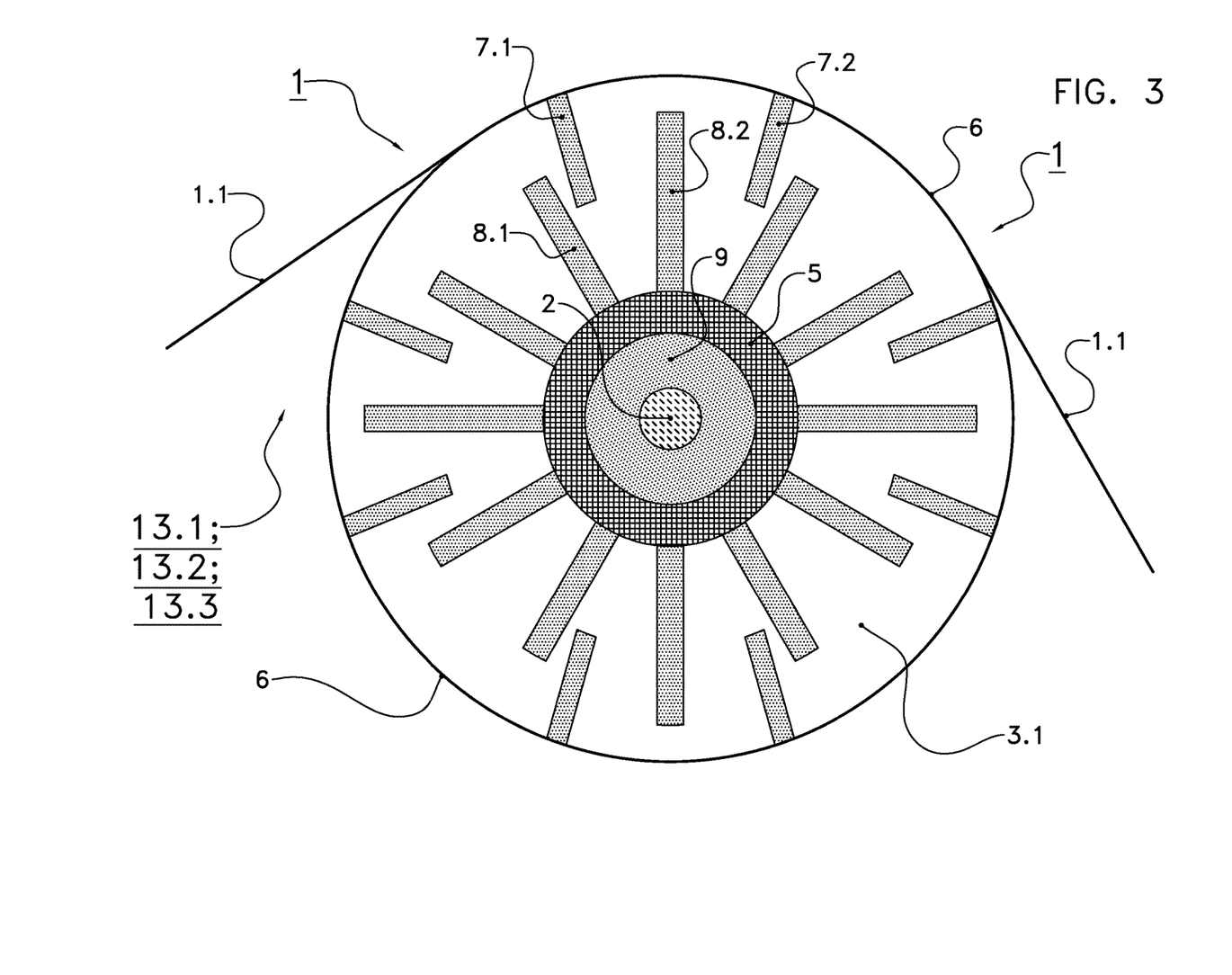
FIG. 3 shows a cross-section through the belt-roller arrangement in the plane II-II of FIG. 2, i.e. perpendicular to the roller axis.

FIG. 3 shows the belt-roller arrangement in the plane II-II of FIG. 2. The roller axle 2 is perpendicular to the drawing plane of FIG. 3. The viewing direction of FIG. 3 is parallel to the roller axle 2.

FIG. 3 shows a supporting structure for the deformable segments 20.1, 20.2. This supporting structure comprises several ribs 7.1, 7.2, . . . , 8.1, 8.2, . . . The inner ribs 8.1, 8.2 are mounted on the inner tubular part 5 of the rigid intermediate roller body segment 22. A distance between the inner ribs 8.1, 8.2, . . . and the circumferential surface 6 occurs. The outer ribs 7.1, 7.2 come in contact with the inner surface of the belt 1, form a part of the circumferential surface 6, and are carried by the lateral rigid parts 23.1, 23.2 of the rigid roller body segment 22. The ribs 7.1, . . . 8.1, . . . are guided through both deformable segments 20.1, 20.2 and through the rigid central part 12 and are carried by the rigid central part 12, cf. FIG. 1 . In one implementation the ribs 7.1, . . . , 8.1, . . . reaches from the left rigid lateral part 23.1 to the right rigid lateral part 23.2.

The supporting structure 7.1, 7.2, . . . , 8.1, 8.2, . . . stabilizes both deformable roller body segments 20.1, 20.2. To achieve this goal, the ribs 7.1, 7.2, . . . , 8.1, 8.2, . . . extend parallel to the roller axle 2 and perpendicular to the drawing plane of FIG. 3 and are guided through the deformable parts 3.1, 4.1, 4.2, 3.2. A further purpose of the supporting structure is to prevent the party deformable roller body 11 from being pivoted with respect to the roller axle 2 or to the roller rotating axis in the conveying direction CD or against the conveying direction CD, in particular from being rotated around an axis perpendicular to the roller axle 2. Thanks to this supporting structure the or one tensioned belt 1 cannot shift the deformable roller body segments 20.1, 20.2 in the conveying direction CD or opposite to the conveying direction CD. In particular the supporting structure avoids a deformation of one deformable roller body segment 20.1, 20.2 in the conveying direction CD or in the opposite direction. This movement is undesired as it would lead to an undesired belt run.

Figure 4:
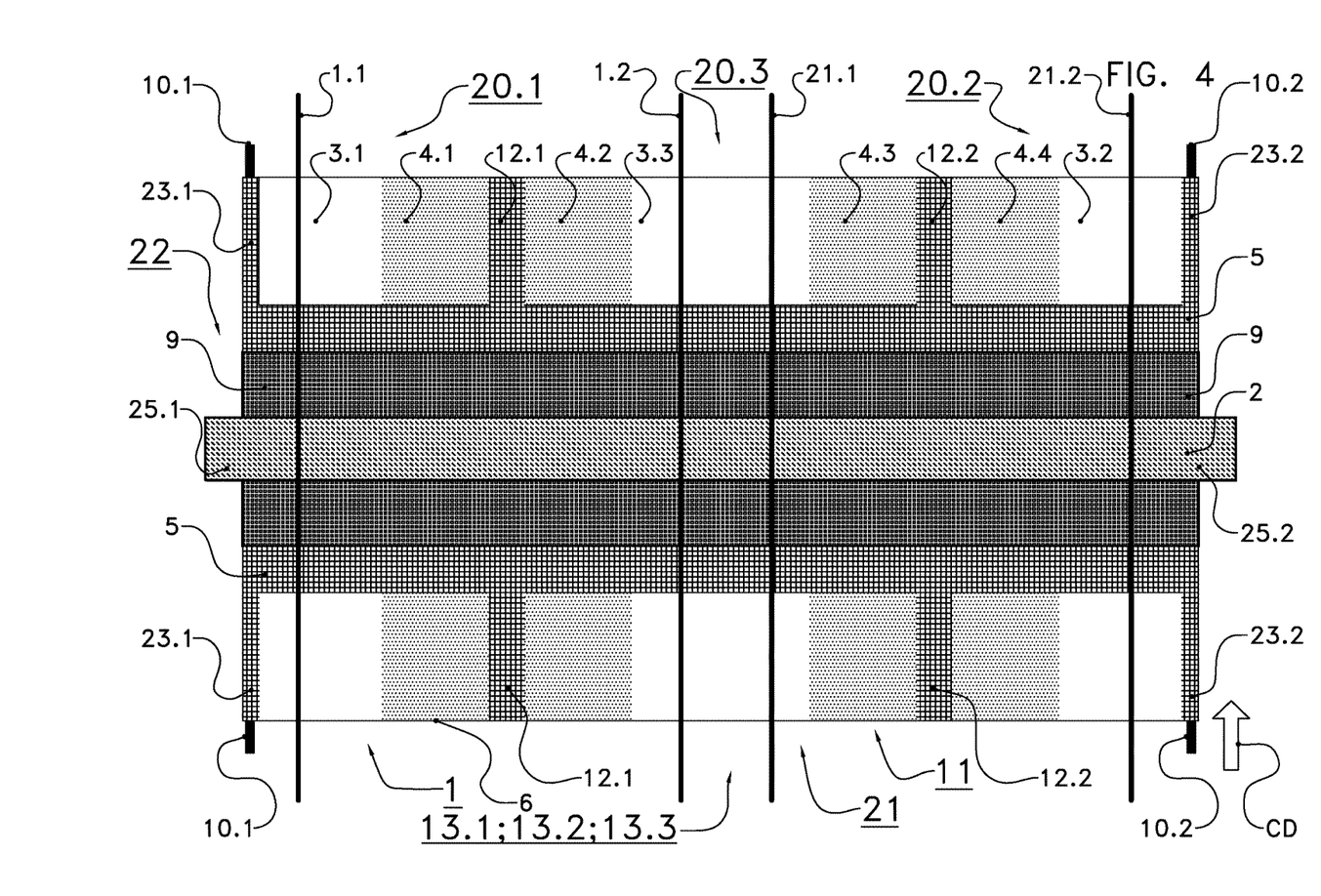
FIG. 4 shows in the viewing direction of FIG. 2 a variant with two parallel belts guided over the same deflecting roller.

FIG. 4 shows in the viewing direction of FIG. 2 a variant of the belt-roller arrangement of FIG. 2. Two parallel endless flexible belts 1, 21 are guided over the roller 13.1, 13.2, or 13.3, namely a left belt 1 with the edges 1.1, 1.2 and a right belt 21 with the edges 21.1, 21.2. When both belts 1, 21 run as desired, the distance between the left edge 1.1 and the stop element 10.1 is equal to the distance between the right edge 21.2 and the stop element 10.2. In addition a nip between the two belts 1, 21 occur.

The roller body 11 according to this variant comprises
three deformable roller body segment parts 3.1, 3.2, 3.3 with a low shore (stiffness),
four further deformable roller body segment parts 4.1, 4.2, 4.3, 4.4 with a medium shore, and
two rigid roller body segment parts 12.1, 12.2 with a high shore,
In addition the roller body 11 of FIG. 4 comprises the same parts than that of FIG. 2, namely
the rigid tubular part 5 of the rigid intermediate segment 22,
the kernel segment 9 surrounding the roller axle 2,
two lateral rigid parts 23.1, 23.2, and
the lateral stop elements 10.1, 10.2.

The parts 3.1, 4.1 form a left deformable roller body segment 20.1. The parts 3.3, 4.2, 4.3 form a central deformable roller body segment 20.3. The parts 3.2, 4.4 form a right deformable roller body segment 20.2. The left belt 1 entirely covers the segment parts 4.1, 12.1, 4.2 and partially the segment parts 3.1 and 3.3. The right belt 21 entirely covers the segment parts 4.3, 12.2, 4.4 and partially the segments parts 3.2 and 3.3. The part 3.3 is therefore covered by both belts 1, 21. The nip between the two belts 1, 21 occur on the part 3.3. The auto-correction function is the same as described with reference to FIG. 2. The run of one belt 1, 21 can automatically be corrected independently from the run of the other belt 21, 1.

The roller 13.1, 13.2, or 13.3 of FIG. 4 can also comprise a supporting structure with ribs as shown in FIG. 2.

Reference signs used in the claims will not limit the scope of the claimed invention. The term "comprises" does not exclude other elements or steps. The articles "a", "an", and "one" do not exclude a plurality of elements. Features specified in several depending claims may be combined in an advantageous manner.

LIST OF REFERENCE SIGNS

| | |
|---|---|
| 1 | endless flexible pressing belt with the lateral edges 1.1, 1.2, moved in the conveying direction CD |
| 1.1, 1.2 | lateral edges of the endless flexible pressing belt 1 |
| 2 | rigid roller axle of the roller 13.1, 13.2, 13.3 |
| 3.1, 3.2 | deformable outer roller body segment parts with a low shore |
| 3.3 | deformable central roller body segment part with a low shore (only in the embodiment with two belts 1, 21) |
| 4.1, 4.2, . . . | deformable inner roller body segment parts with a medium shore |
| 5 | inner tubular part of the rigid roller body segment 22 with a high shore, surrounds the kernel 9 |
| 6 | circumferential surface of the roller body 11 |
| 7.1, 7.2 | outer ribs of the supporting structure, connected with the lateral parts 23.1, 23.2 and touched by the belt 1 |
| 8.1, 8.2 | inner ribs of the supporting structure, mounted on the inner rigid roller body segment part 5 |
| 9 | kernel roller body segment, mounted around the axle 2 in the interior of the tubular part 5, can be rigid or deformable or hollow |
| 10.1, 10.2 | lateral stop elements for the belts 1, 21, mounted on the lateral rigid parts 23.1, 23.2 |
| 11 | round-cylindrical roller body, comprising the deformable segments 20.1, 20.2, ... and the further segments 9, 22 |
| 12 | rigid central roller body segment part (embodiment with one belt 1) |
| 12.1, 12.2 | rigid central roller body segment parts with a high shore (embodiment with two belts 1, 21) |
| 13.1 | driven deflecting roller with the roller body 11 and the roller axle 2, drives the belts 1, 21 |
| 13.2 | idler roller mounted at the tailgate 29, deflects the belts 1,21 |
| 13.3 | idler rollers mounted at the tensioning arrangement 15, deflect the belts 1,21 |
| 14 | pick-up unit with a driven pick-up drum |
| 15 | pivotal tensioning arrangement for the pressing belts 1, carries the rollers 13.3 |
| 16 | towing unit of the round baler 30 |

| | |
|---|---|
| 17 | supply reel with wrapping material |
| 18.1, 18.2 | driven starter rollers delimiting the crop material inlet |
| 19 | driven conveying rotor, engages from above into the feeding channel |
| 20.1 | left deformable roller body segment, comprises the parts 3.1 and 4.1 |
| 20.2 | right deformable roller body segment, comprises the parts 3.2 and 4.2 (one belt 1) and the parts 3.2 and 4.4 (two belts 1, 21) |
| 20.3 | central deformable roller body segment (only embodiment with two belts 1, 21), comprises the parts 3.3, 4.2, 4.3 |
| 21 | further endless pressing belt with the edges 21.1, 21.1 also moved in the conveying direction CD |
| 21.1, 21.2 | lateral edges of the further endless flexible pressing belt 21 |
| 22 | rigid intermediate body segment, comprises the parts 5, 23.1, and 23.2 and the central part 12 (one belt) or the central parts 12.1, 12.2 (two belts) |
| 23.1, 23.2 | lateral parts of the rigid intermediate body segment 22, carry the stop elements 10.1, 10.2 |
| 24 | web of wrapping material, pulled from the supply reel 17 |
| 25.1, 25.2 | lateral stubs of the roller axle 2 |
| 26 | web feeding roller |
| 27 | pivotal downholder unit, positioned angularly above the pick-up unit 14 |
| 28 | retaining device for the tensioning arrangement 15, comprises two vertical piston-cylinder units |
| 29 | pivotal discharge gate |
| 30 | round baler, serves as the harvester with the belt-roller arrangement |
| CD | conveying direction of the belt 1, 21 |
| Ch | bale forming chamber of the baler 30, surrounded by the belts 1 |
| TD | travelling direction in which the baler 30 is pulled over ground |

The invention claimed is:

1. A belt-roller arrangement comprising:
at least one deflecting roller with a round-cylindrical roller body comprising a circumferential surface; and
at least one endless flexible belt guided under tension over the circumferential surface,
wherein the roller body comprises:
at least one rigid roller body segment; and
at least one deformable roller body segment,
wherein the at least one rigid roller body segment or every rigid roller body segment has a higher stiffness than the at least one deformable roller body segment or every deformable roller body segment, and
wherein the at least one endless flexible belt or every belt of the arrangement is guided around the at least one rigid roller body segment or at least one rigid roller body segment and is guided around the at least one deformable roller body segment or at least one deformable roller body segment,
wherein the roller body further comprises at least two more deformable roller body segments,
wherein the at least one rigid roller body segment or at least one rigid roller body segment comprises a central roller body segment part which is positioned in an axial direction between the two deformable roller body segments or between two adjacent deformable roller body segments, and
wherein the at least one endless flexible belt or every belt is entirely guided over the central roller body segment part and the at least one endless flexible belt is partially guided over the two deformable roller body segments or over two adjacent deformable roller body segments.

2. The belt-roller arrangement according to claim 1, wherein the round-cylindrical roller body comprises a supporting structure with at least one rigid rib and the or at least one deformable roller body segment comprises a deformable part made from at least one deformable material, and wherein the or every supporting rib is guided through the deformable part.

3. The belt-roller arrangement according to claim 2, wherein the deflecting roller further comprises a roller axle carrying the round-cylindrical roller body, and
wherein the or at least one rib of the supporting structure is connected with the roller axle.

4. The belt-roller arrangement according to claim 2 wherein the or at least one rib of the support structure is in contact with the or every belt guided over the circumferential surface.

5. The belt-roller arrangement according to claim 2, wherein the or at least one rib is guided through both or at least two deformable segments and through the or every rigid central part.

6. The belt-roller arrangement according to claim 1, wherein the roller body is mounted on a roller axle, and
wherein the rigid roller body segment comprising the or every central roller body segment part extends radially from the roller axle to the circumferential surface.

7. The belt-roller arrangement according to claim 1, wherein the deflecting roller further comprises a roller axle carrying the cylindrical roller body,
wherein a further rigid roller body segment or a further rigid part of the rigid intermediate body segment is radially positioned between at least one deformable roller body segment and the roller axle.

8. The belt-roller arrangement according to claim 1, wherein at least one deformable roller body segment comprises:
at least one outer deformable roller body segment part; and
at least one inner deformable roller body segment part,
wherein the or every outer deformable roller body segment part has a lower stiffness than the or every inner deformable roller body segment part, and
wherein the or every inner deformable roller body segment part is positioned in an axial direction between the or one outer deformable roller body segment part and the or one central roller body segment part.

9. The belt-roller arrangement according to claim 8, wherein the or at least one outer deformable roller body segment part and the or at least one inner deformable roller body segment part together provide a part of the circumferential surface and the or every belt is entirely guided over the or at least one inner deformable roller body segment part and is partially guided over the or at least one outer deformable roller body segment part.

10. The belt-roller arrangement according to claim 1, wherein the deflecting roller further comprises a roller axle carrying the round-cylindrical roller body, and
wherein at least one deformable roller body segment extends from the roller axle to the circumferential surface.

11. The belt-roller arrangement according to claim 1, wherein exactly one belt is guided under tension over the circumferential surface.

12. The belt-roller arrangement according to claim 1, wherein the arrangement comprises n parallel endless flexible belts guided under tension in a side-by-side fashion over the circumferential surface,
wherein n is at least 2,
wherein the or at least one roller body comprises at least (n+1) deformable roller body segments arranged in a sequence in an axial direction,
wherein the rigid roller body segment comprises at least n rigid central roller body segment parts arranged in a further sequence in the axial direction,
wherein every rigid central roller body segment part is positioned between two adjacent deformable roller body segments, and
wherein every belt is entirely guided over one rigid central roller body segment part and is partially guided over two adjacent deformable roller body segments.

13. The belt-roller arrangement according to claim 1, wherein the or every belt is driven and is arranged to set the deflecting roller into rotation.

14. The belt-roller arrangement according to claim 1, wherein the deflecting roller is rotated and is arranged to drive the or every belt.

15. An agricultural harvester comprising a belt-roller arrangement, wherein the belt-roller arrangement comprises:
at least one deflecting roller with a round-cylindrical roller body comprising a circumferential surface; and
at least one endless flexible belt guided under tension over the circumferential surface,
wherein the roller body comprises:
at least one rigid roller body segment; and
at least one deformable roller body segment,
wherein the at least one rigid roller body segment or every rigid roller body segment has a higher stiffness than the at least one deformable roller body segment or every deformable roller body segment, and
wherein the at least one endless flexible belt or every belt of the arrangement is guided around the at least one rigid roller body segment or at least one rigid roller body segment and is guided around the at least one deformable roller body segment or at least one deformable roller body segment,
wherein the roller body further comprises at least two more deformable roller body segments,
wherein the at least one rigid roller body segment or at least one rigid roller body segment comprises a central roller body segment part which is positioned in an axial direction between the two deformable roller body segments or between two adjacent deformable roller body segments,
wherein the at least one endless flexible belt or every belt is entirely guided over the central roller body segment part and the at least one endless flexible belt is partially guided over the two deformable roller body segments or over two adjacent deformable roller body segments, and
wherein the belt-roller arrangement is arranged to convey loose crop material in an interior of the harvester.

16. The agricultural harvester according to claim 15, wherein the harvester comprises a bale forming chamber and a feeder arranged to feed loose crop material towards the bale forming chamber and to inject the loose crop material in the bale forming chamber,
wherein the harvester is arranged to form under pressure from injected loose agricultural material a bale in the bale forming chamber,
wherein the or every belt which is guided over the deflecting roller delimits the bale forming chamber and applies a pressure onto the loose material in the bale forming chamber.

17. The agricultural harvester according to claim 15, wherein the loose material in the bale forming chamber tends to expand against the retaining force of the or every pressing belt surrounding the bale forming chamber.

18. The agricultural harvester according to claim 15, wherein the harvester comprises:
a conveying arrangement; and
a storage room,
wherein the conveying arrangement comprises the belt-roller arrangement and is arranged to convey loose material towards the storage room or in the interior of the storage room.

19. A method for guiding at least one endless flexible belt under tension over at least one deflecting roller,
wherein the deflecting roller comprises a round-cylindrical roller body with a circumferential surface,
wherein the roller body comprises:
at least one rigid roller body segment; and
at least one deformable roller body segment,
wherein the at least one rigid roller body segment or every rigid roller body segment has a higher stiffness than the at least one deformable roller body segment or every deformable roller body segment, and
wherein the at least one endless flexible belt or every belt is guided over the circumferential surface such that the belt is guided over the at least one rigid roller body segment or at least one rigid roller body segment and the belt is guided over the at least one deformable roller body segment or at least one deformable roller body segment, and
wherein the method comprises the steps of:
rotating the roller; and
moving the at least one endless flexible belt or every belt with respect to the roller,
wherein the roller body further comprises at least two more deformable roller body segments and the at least one rigid roller body segment or at least one rigid roller body segment comprises a central roller body segment part which is in an axial direction positioned between the two deformable roller body segments or between two adjacent deformable roller body segments, and
wherein the at least one endless flexible belt or every belt is guided over the circumferential surface such that the belt is entirely guided over the central roller body segment part and the belt is partially guided over the two deformable roller body segments or over two adjacent deformable roller body segments.

20. The belt guiding method according to claim 19, wherein the method is used on board of an agricultural harvester, and
   wherein the method is used for conveying loose crop material in the interior of the harvester.

21. The belt guiding method according to claim 20, wherein the harvester comprises a bale forming chamber,
   wherein the or every belt which is guided over the deflecting roller surrounds the bale forming chamber and
   wherein the method further comprises the steps of:
   injecting loose material into the bale forming chamber;
   the or every belt applying pressure onto the loose material in the bale forming chamber; and
   forming a bale under pressure from the loose material in the bale forming chamber.

* * * * *